United States Patent [19]
Moore

[11] Patent Number: 5,351,909
[45] Date of Patent: Oct. 4, 1994

[54] FAST-FORWARDING LOCKING TAPE CASSETTE

[76] Inventor: Clay E. Moore, 4214 Simmons Dr., Rowlett, Tex. 75088

[21] Appl. No.: 933,984

[22] Filed: Aug. 21, 1992

Related U.S. Application Data

[63] Continuation-in-part of Ser. No. 919,761, Jul. 24, 1992, abandoned.

[51] Int. Cl.$^5$ ............................................. G11B 15/32
[52] U.S. Cl. ................................................. 242/343
[58] Field of Search .................. 242/199, 198, 191; 360/132

[56] References Cited

U.S. PATENT DOCUMENTS

| | | | |
|---|---|---|---|
| 3,690,750 | 9/1972 | Taillon | 352/124 |
| 3,732,477 | 5/1973 | Cicatelli | 318/463 |
| 3,801,039 | 4/1974 | Emmert | 242/191 |
| 4,380,322 | 4/1983 | Yeh | 242/198 |
| 4,482,104 | 11/1984 | Saito | 242/198 |
| 4,618,904 | 10/1986 | Manning | 360/132 |
| 4,702,434 | 10/1987 | Brauer | 242/198 |
| 4,802,048 | 1/1989 | Perkins | 242/198 X |
| 5,005,099 | 4/1991 | Perryman et al. | 360/132 |

*Primary Examiner*—Daniel P. Stodola
*Attorney, Agent, or Firm*—Harris, Tucker & Hardin

[57] ABSTRACT

A fast-forward locking mechanism prevents fast-forwarding of video tape cassettes through commercials or special announcements. The locking mechanism includes a locking pin or arm attached to a pay out reel that extends to catch edges of projections preexisting along an inner periphery of the video cassette casing next to the pay out reel. Centripetal acceleration generated by the rotational velocity of the pay out reel in excess of a maximum permitted rotational velocity during normal tape play speeds of the video tape cassette extends the pin or pivoting member. Once the pin or pivoting member is extended, the tape tenses as it being pulled by a take up reel. The video cassette player/recorder senses the tensed tape and turns off the motor driving the take up reel. The pin is retracted by either reversing the direction of the pay out reel or by a biasing spring. Projections for catching the extended pin or arm are molded into the video cassette casing near the pay-out reel's periphery.

15 Claims, 1 Drawing Sheet

FAST-FORWARDING LOCKING TAPE CASSETTE

CROSS-REFERENCE TO RELATED APPLICATION

This is a continuation-in-part of now abandoned application by Clay Edward Moore, Ser. No. 919,761 filed Jul. 24, 1992 for "VIDEO TAPE CASSETTE WITH FAST-FORWARD LOCK AND METHOD FOR PREVENTING FAST-FORWARDING OF VIDEO TAPE CASSETTE."

BACKGROUND OF THE INVENTION

1. Field of the Invention

The invention relates to a fast-forwarding lock for a cassette for magnetic tape, and more particularly to a video tape cassette having a mechanism for preventing fast-forwarding of the video tape.

2. Description of the Prior Art

Video cassette releases have become an increasingly important source of income for the film industry. One source of revenue in the video market is advertising. But the value and effectiveness of advertising on a commercially-recorded video cassette is lessened by the ease with which a video can be fast-forwarded past any advertisements. Preventing such fast-forwarding would increase the value of the advertising time. Preventing fast-forward movement of copyrighted tapes can also prevent the potential use of high-speed duplicating machines for purposes of copyright violation.

A method of preventing fast-forwarding in a video cassette is disclosed in U.S. Pat. No. 5,005,099 of Perryman et al. In the '099 Patent, a light source is mounted inside the cassette casing. The light source is powered by a battery or by a generator driven by the movement of the tape reels, which battery or generator must also be built into the cassette casing. If the light is battery powered, the light is controlled by a mechanical tension-sensing switch. If the light is generator powered, it is controlled by the speed of the generator, i.e., by the speed of the tape wheels. In either case, when the light shines it activates standard photoelectric circuitry in the video cassette recorder (VCR) which stops the VCR.

This prior art method is rather complex. It involves electrical, mechanical, and, in the battery powered version, chemical components. This complexity poses two problems. First, reliability is a problem because this stopping method depends on the proper functioning of many components, some of which are themselves rather complex, as in the battery or the generator. Second, the number and complexity of the individual components makes the device expensive to manufacture.

SUMMARY OF THE INVENTION

The invention uses a stopping mechanism which is mounted on the pay-out tape reel. This mechanism, in response to a pre-set level of centripetal acceleration, locks against the inside of the cassette casing, preventing the pay-out reel from rotating. The VCR's built-in tape tension sensor then shuts off the VCR. Compared with the prior art, this invention provides a less expensive, purely mechanical solution to the problem of unwanted fast-forwarding with fewer parts. This invention also requires a minimum of modifications to existing cassette design. This invention is affixed to the pay-out reel of a standard video cassette and is operable with only slight modifications to the cassette. This invention may also be applicable to cassettes other than video cassettes.

DETAILED DESCRIPTION OF THE PREFERRED EMBODIMENTS

Figure 1:
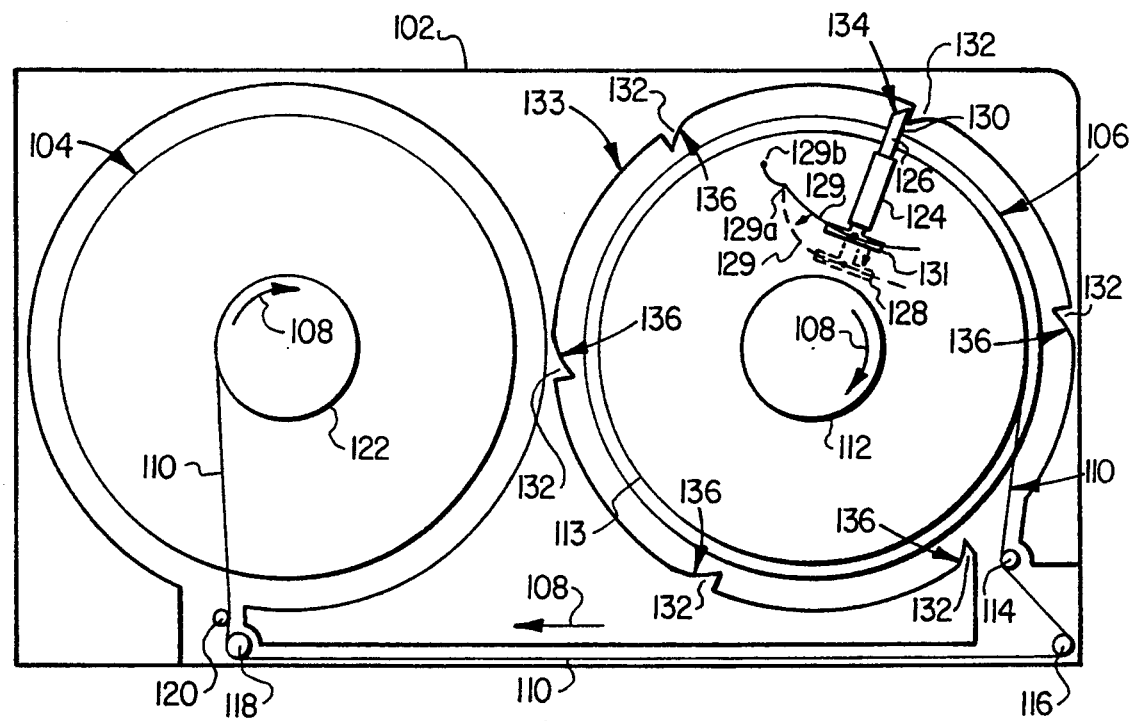
FIG. 1 is a schematic representation of a top elevational view of a standard video tape cassette with the top portion of its casing removed to show a fast-forward lock in accordance with the invention. Only pertinent details of the lower portion of the casing are drawn.

Referring to FIG. 1, a video tape cassette in a VHS format includes a lower casing portion 102 of a cassette casing. The top portion of the casing has been removed and is not shown. Video tape cassettes for consumers are most commonly found in the VHS and Beta formats. However, the invention is applicable to other tape and cassette formats. Mounted for rotation within the lower portion of the casing are a take-up reel 104 and a pay-out reel 106. The forward playing direction of each reel and the direction of tape travel is shown by arrows 108. Tape 110 is wound around hub 112 of pay-out reel 106, as indicated by outline 113, and threaded through a series of capstans 114, 116, 118 and 120 to hub 122 of take-up reel 104.

Mounted on a top side of pay-out reel 106 is a sleeve 124. A flat pin 126 extends through sleeve 124. So that the pin and the sleeve may be fitted to preexisting cassette designs, both the sleeve and the pin have a relatively low-profile to permit a standard top portion of the casing to be positioned on lower casing portion 102 without modification. Sleeve 124 retains pin 126 so that the pin moves linearly between the extended position as indicated and a retracted position indicated by dashed lines 128.

A spring 129, formed of stiff wire with a kink 129a, is attached to the top of pay-out reel 106 at point 129b so that the spring creates a rotational force that biases pin 126 in the retracted position. The spring's biasing force must be small enough that the smallest centripetal acceleration caused by fast-forwarding is sufficient to fully extend the pin and yet great enough that the largest centripetal acceleration during play speeds is not sufficient to extend the pin far enough to catch a stop.

During normal tape play speeds, the maximum centripetal acceleration on pin 126 generated by the angular velocity of pay-out reel 106 is not sufficient to overcome the biasing force of spring 129. Thus, the pin remains in its retracted position shown by dashed lines 128 during normal play speeds. The video cassette player/recorder (VCR) drives the tape at a constant speed. The angular velocity of the pay out reel therefore depends on the radial distance of the periphery of the tape wound on the pay out reel.

When the tape is fast-forwarded, the angular velocity of pay-out reel 106 increases beyond a maximum expected speed occurring during normal tape play speeds. This relatively high angular or rotational velocity creates a centripetal acceleration sufficient to overcome the biasing force of spring 129 and any friction between pin 126 and sleeve 124 and to move the pin from its retracted to its extended position. When pin 126 extends, its front surface 130 catches one of a plurality of stops 132 and locks rotation of the pay-out reel 106, stopping fast-forwarding of tape 110. The pin, sleeve and stop cooperate to form a fast-forward locking mechanism. A flared end portion 131 cooperates with sleeve 124 to prevent overextension.

Stops 132 are molded into lower casing portion 102 at relatively evenly spaced intervals along the periphery 133 of the pay-out reel 106. The intervals are carefully chosen. If the stops are too closely spaced, the pin simply "chatters" during fast-forwarding and is unable to fully extend.

Alternately, the friction between pin 126 and sleeve 124 may be a force sufficient to hold the pin in its retracted position during normal tape play speeds without spring 129. The magnitude of the frictional force depends on the coefficient of friction of the outer surfaces of the pin and the inner surfaces of the sleeve, the closeness of the fit of pin 126 within the sleeve 124, and the angle of the pin to the direction of the centripetal acceleration. The centripetal acceleration necessary to extend the pin should be substantially greater than the maximum centripetal acceleration generated by the angular speed of the pay-out reel during the play mode to ensure that there is no pin extension. Yet, it should also be less than the minimum centripetal acceleration generated during fast-forwarding. Rather than modify or choose the surfaces and closeness of fit to develop the desired coefficient of friction, the pin and sleeve may be slanted with respect to the axis of rotation of the pay-out reel, to create, during centripetal acceleration, a force normal to one set of adjacent surfaces of the pin and sleeve, thereby increasing the magnitude of the frictional force. However, the direction of translation of the pin may be exactly in the direction of the centripetal acceleration if suitable surfaces and fit are used to create sufficient friction.

Although not shown in the drawings, it is well known that during "fast-forward" modes of operation of a VCR, a fast-forward drive gear engages a bottom side of hub 122 to rotate take-up reel 104. The pay-out reel freely rotates. A standard VCR is equipped with a tension sensing switch for sensing tension in the tape to prevent the VCR from breaking the tape. The tension sensing switch turns off the play, fast-forward and reverse motors in the event the tension on the tape exceeds a preset maximum level. Although the tension sensing switch is well known in the art, it may assume a variety of possible configurations, depending on the VCR. Locking of the pay-out reel results in the fast-forward motor driving the take-up reel to tense the tape 110 beyond the preset maximum level, causing the tension sensing switch to turn off the fast-forward motor. Once stopped, the VCR typically rewinds the pay-out reel 106 a small amount. The biasing force of spring 129 retracts pin 126.

The sloping back surfaces 136 on each of the plurality of stops 132 serve two functions. First, during rewind, the sloping back surfaces ensure that pin 126 does not catch should it extend. Angled back surface 134 engages a sloping back surface 136 during reverse rotation of the pay-out reel 106 and pushes pin 126 to its retracted position shown by dashed lines 128. The angle of angled back surface 134 assists in pushing the pin in with minimal interference in rotation of the pay-out reel. The flatness of the pin and closeness of fit of the pin to the sleeve maintains proper orientation of the angled back surface. Alternately, the pin may be keyed to the sleeve to maintain the proper orientation. Second, if spring 129 is not used, the sloping back surfaces 136 in cooperation with the angled back surface 134 of pin 126, pushes pin 126 to its retracted position. Usually, the small rewind of the pay-out reel that typically occurs after a tension-triggered stop is sufficient to move the pin to an adjacent stop 132 and push the pin inwardly. However, the VCR may be placed in rewind mode if necessary to retract the pin.

The flared end 131 of the pin and the hub 112, raised slightly with respect to a top surface of pay-out reel 106, cooperate to prevent the pin from retracting out of the sleeve. Slanting of pin 126 and sleeve 124, as previously described in connection with increasing friction, assists in retracting the pin.

Figure 2:
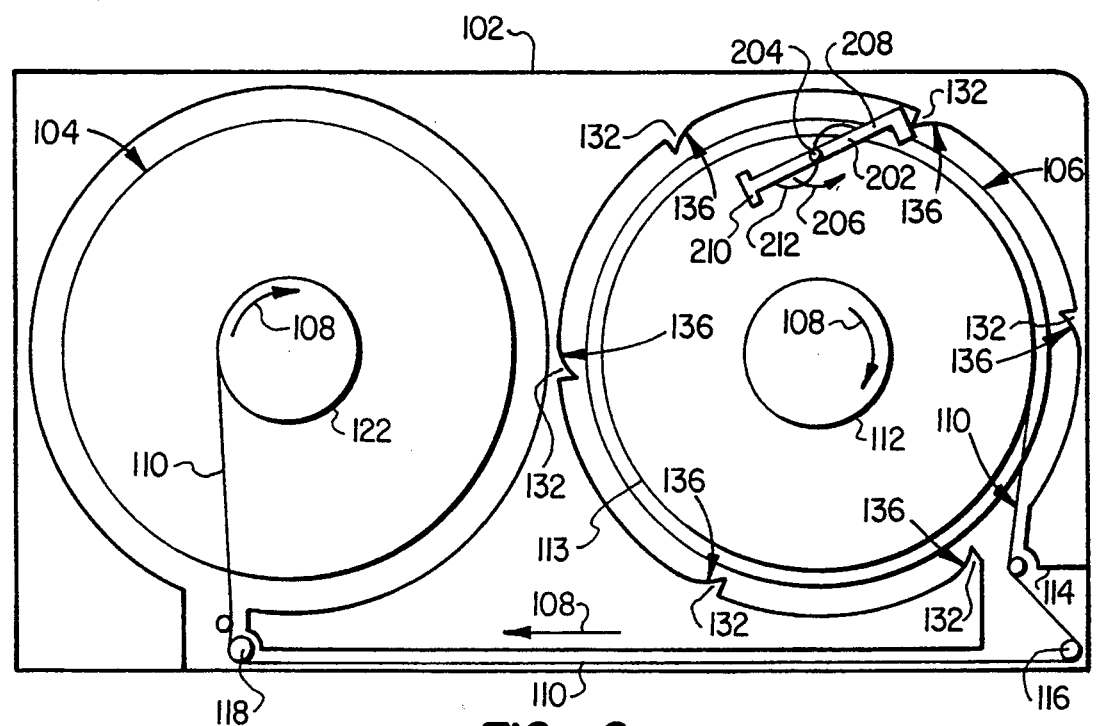
FIG. 2 is a schematic representation of a top elevational view of a standard video tape cassette with the top portion of its casing removed to show an alternate embodiment of the fast-forward lock mechanism in accordance with the invention. Only pertinent details of the lower portion of the casing are drawn.

Referring now to FIG. 2, an alternate embodiment for the stopping mechanism includes rocker arm 202 that swings around pivot 204 in the direction indicated by arrow 206 due to a catch portion 208 of the arm having a greater mass and thus a greater moment of inertia than the tail portion 210. The arm is shown extended and catching on one of the plurality of stops 132. The arm is biased with stiff wire spring 212 in a retracted position in which neither the tail nor the catch portions are extended, and the arm is essentially in equilibrium about pivot 204. Spring 212 is designed and positioned with respect to the pay-out wheel so that its biasing force is zero at the retracted position. Sloping back surfaces 136, again, prevent accidental catching by rocker arm 202 during tape rewind.

Several other arrangements using a rotating catch means, as opposed to a linearly extending catch means such as a pin, are possible. For example, the pivot may be placed at the tail end of the arm and a coiled spring attached between the catch end and a pin on the pay out reel for biasing the catching arm in a retracted position. Further, the rocker arm may be reversed so that it pivots in a direction opposite of arrow.

Only the preferred embodiments of the invention have been described. Numerous modifications to the preferred embodiments are possible without departing from the spirit and scope of the invention as set forth in the appended claims.

What is claimed is:

1. A fast-forward locking tape cassette, comprising:
   a pay-out reel;
   a take-up reel;
   a casing for enclosing the take-up reel and pay-out reel;
   catching means;
   attaching means for attaching the catching means to the pay-out reel of the cassette;
   stopping means fixed to the casing of the cassette for the catching means to butt against, stopping the pay-out reel from rotating in the paying-out direction; and
   retracting means for biasing the catching means against inertial forces;
   said catching means being an extended body, said attaching means movably attaching the catching means to the pay-out reel such that the catching means moves relative to the pay-out reel in response to a predetermined level of centripetal acceleration of the attaching means produced by the rotation of the pay-out reel, such movement of the catching means causing the catching means to butt against the stopping means, stopping the pay-out reel from rotating in the pay-out direction.

2. The fast-forward locking tape cassette of claim 1, wherein the catching means comprises a sliding pin; and wherein the attaching means allows the sliding pin to slide in the direction of the longitudinal length of the sliding pin and predominantly in a radial direction with respect to the pay-out reel, the furthest radial extent of the sliding motion being such that the sliding pin at that furthest extent catches on the stopping means when the pay-out reel rotates in the paying-out direction, the least radial extent of the sliding motion being such that the sliding pin at that least extent does not catch on the stopping means when the pay-out reel rotates in the paying-out direction.

3. The fast-forward locking tape cassette of claim 2, wherein the retracting means comprises a slanted surface on the end of the sliding pin furthest from the center of the pay-out reel, the slanted surface being slanted such that when the pay-out reel rotates in a taking-up direction, the stopping means contacts the slanted surface so as to push the sliding pin toward the least radial extent of the sliding pin's motion.

4. The tap cassette of claim 2, wherein the direction of the sliding motion of the sliding pin with respect to the pay-out reel is slanted somewhat from the directly radial direction.

5. The tape cassette of claim 1, wherein the retracting means includes a spring coupled to the catching means for biasing the catching means to a retracted position when the rotation of the pay-out wheel produces less than the predetermined level of centripetal acceleration.

6. The fast-forward locking tape cassette of claim 1 wherein the stopping means comprises a plurality of protrusions integrally molded with the inside of the cassette casing around the circumference of the pay-out reel, said protrusions having sharp slopes on one side and gentle slopes on the other, the sharp slopes being on the side which the catching means, when moved in response to the centripetal acceleration of the attaching means, butts against when the pay-out reel rotates in the paying-out direction.

7. The tape cassette of claim 6, wherein the catching means comprises a sliding pin; and wherein the attaching means allows the sliding pin to slide in the direction of the longitudinal length of the sliding pin, and in a mainly radial direction with respect to the pay-out reel, the furthest radial extent of the sliding motion being such that the sliding pin at that furthest extent catches on the stopping means when the pay-out reel rotates in the paying-out direction, the least radial extent of the sliding motion being such that the sliding pin at the least extent does not catch on the stopping means when the pay-out reel rotates in the paying-out direction.

8. The fast-forward locking tape cassette of claim 7, wherein the retracting means comprises a slanted surface on the end of the sliding pin furthest from the center of the pay-out reel, the slanted surface being slanted such that when the pay-out reel rotates in the taking-up direction, the stopping means contacts the slanted surface so as to push the sliding pin to the least radial extent of the sliding pin's sliding motion; and wherein the attaching means attaches the sliding pin so as to prevent any rotation of the sliding pin.

9. The fast-forward locking tape cassette of claim 8, wherein the direction of the sliding motion of the sliding pin with respect to the pay-out reel is slanted somewhat from the directly radial direction.

10. The tape cassette of claim 7, wherein the retracting means comprises the gentle slopes of the protrusions which, when the pay-out reel rotates in the taking-up direction, push the sliding pin to the least radial extent of the sliding pin's motion.

11. The fast-forward locking tape cassette of claim 10, wherein the direction of the sliding motion of the sliding pin with respect to the pay-out reel is slanted somewhat from the directly radial direction.

12. The tape cassette of claim 6, wherein the retracting means includes a spring coupled to the catching means for biasing the catching means to a retracted position when the rotation of the pay-out wheel produces less than the predetermined level of centripetal acceleration.

13. The fast-forward locking tape cassette of claim 1, wherein the catching means comprises an arm; and wherein the attaching means comprises a pivot about which the arm pivots and extends outwardly.

14. The fast-forward locking tape cassette of claim 13 wherein the retracting means is a spring.

15. The fast-forward locking tape cassette of claim 1 wherein said catching means and said stopping means are so arranged that the catching means abuts the stopping means and stops the pay-out reel when the pay-out reel is moving in the paying-out direction, but not when the pay-out reel is moving in the taking-up direction.

* * * * *